United States Patent [19]

Hatfield

[11] 3,877,742

[45] Apr. 15, 1975

[54] LEAF CASKET

[76] Inventor: Clarence W. Hatfield, Rt. 2, Box 2528T, Auburn, Calif. 95603

[22] Filed: June 5, 1973

[21] Appl. No.: 367,171

[52] U.S. Cl. ................ 294/55; 56/400.16; 220/4 E; 220/19; 220/94 R; 294/1 R; 294/50.8
[51] Int. Cl. ............................................. B65d 13/00
[58] Field of Search .......... 294/55, 50.5, 50.6, 50.9, 294/52, 53.5, 50.8, 25, 1 R; 56/400.11, 400.12, 400.16, 400.2; 220/4 E, 4 B, 19, 94 A, 94 R; 217/122; 190/49, 57; 209/274, 281, 417, 418, 419

[56] References Cited
UNITED STATES PATENTS

| 102,049 | 4/1870 | Scanlan | 294/106 |
|---|---|---|---|
| 1,039,613 | 9/1912 | Tittsworth | 294/50.8 |
| 1,138,371 | 5/1915 | Flynn | 294/50.8 |
| 1,588,927 | 6/1926 | Willis | 294/50.8 |
| 2,545,226 | 3/1951 | Claude | 209/419 UX |
| 2,546,113 | 3/1951 | Spang | 294/49 X |
| 3,672,716 | 6/1972 | Burkhalter | 294/50.6 |

*Primary Examiner*—Richard A. Schacher
*Assistant Examiner*—James L. Rowland
*Attorney, Agent, or Firm*—Blair & Brown

[57] ABSTRACT

A leaf casket for handling dead leaves or similar material consisting of a pair of baskets which are open on one face and provided with interlocking teeth along the open faces to permit the baskets to be fitted together manually to secure leaves therebetween. The baskets have interfitting handles which are tapered to permit pressure to be brought to bear to help secure the basket in position supporting the leaves.

1 Claim, 8 Drawing Figures

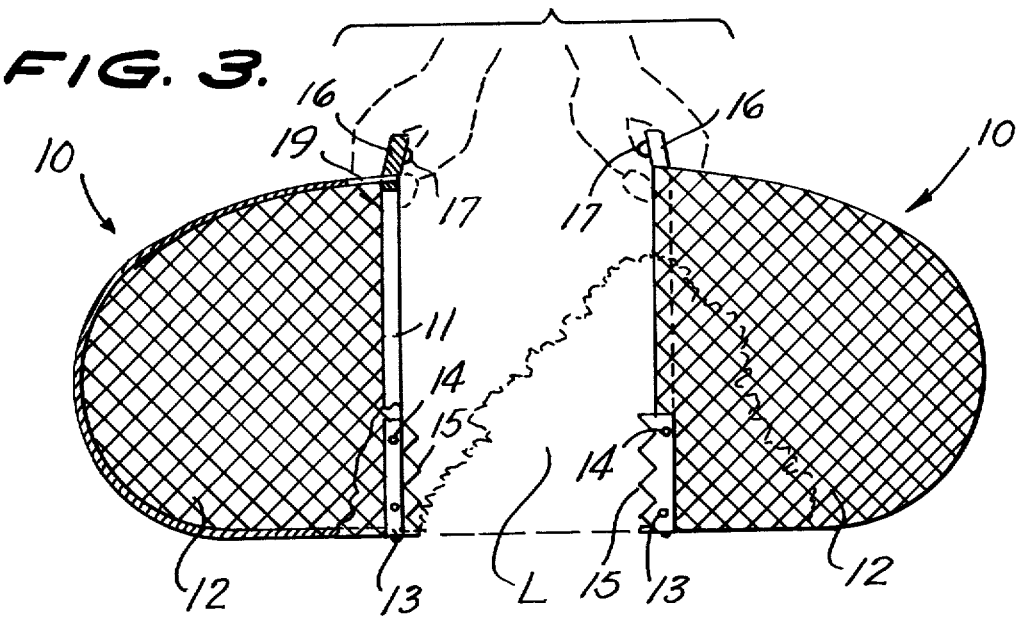
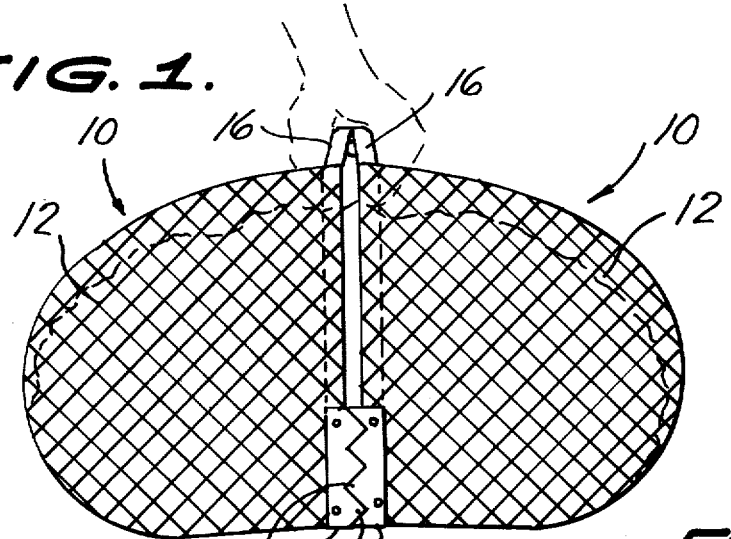
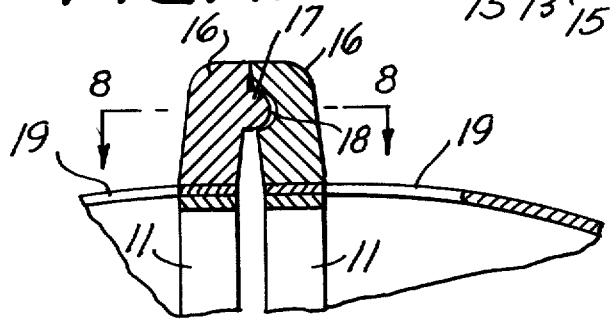
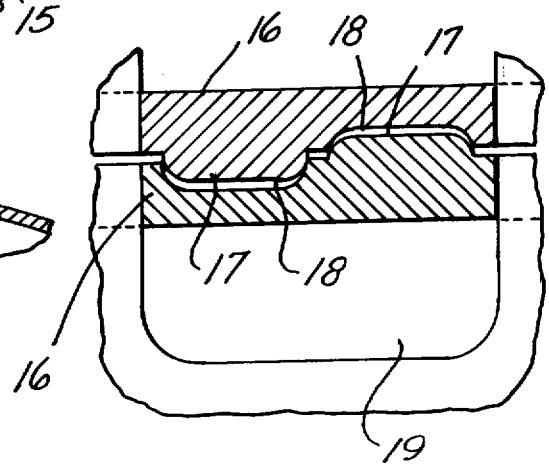

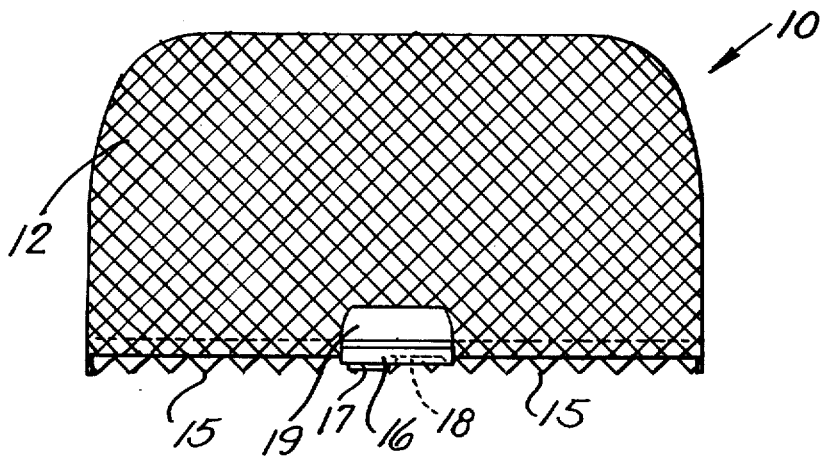
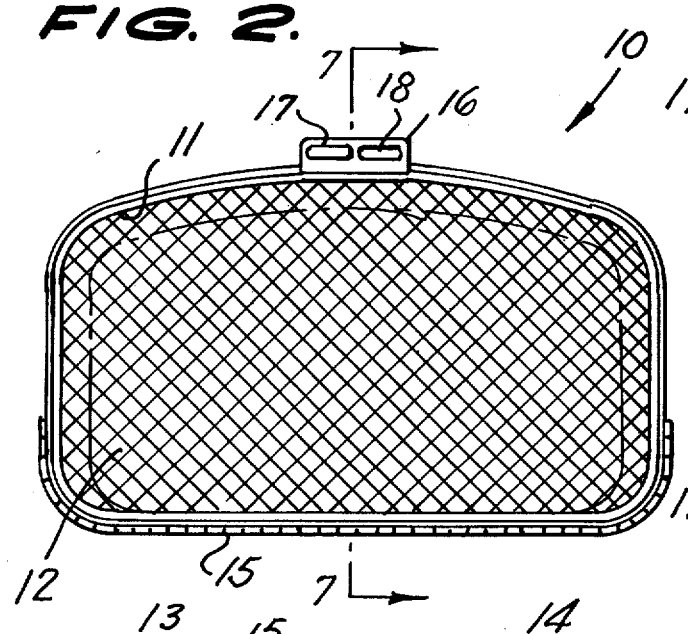
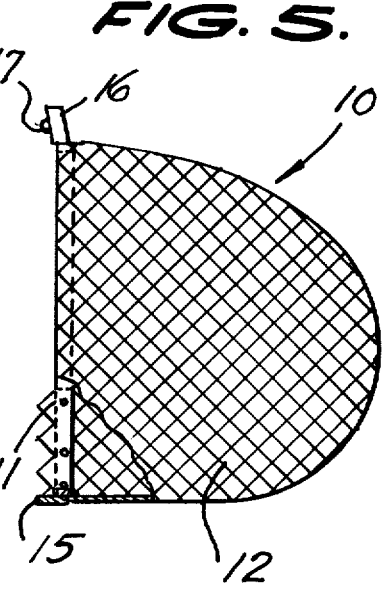
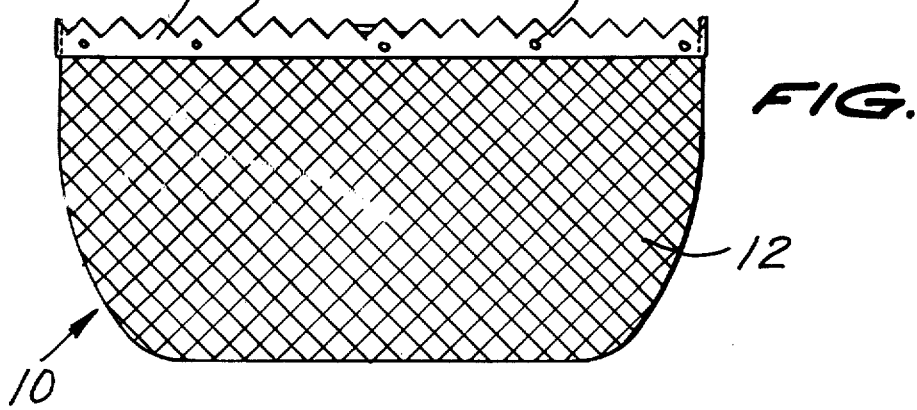

LEAF CASKET

BACKGROUND OF THE INVENTION

1. Field of the Invention

The present invention relates to leaf caskets for handling dead leaves or similar material.

2. Summary of the Invention

The leaf caskets of the present invention include a pair of baskets having one opening side with interfitting teeth positioned along the lower portion of the open sides and an interfitting handle positioned at the upper edge thereof so that the baskets can be drawn together around a pile of dead leaves so as to enclose the leaves therein. The handles are tilted toward each other slightly so that hand pressure on the handles tends to tightly secure the baskets together with the leaves therein.

The primary object of the invention is to provide a handy easily used device for gathering and handling leaves and other materials.

Other objects and advantages will become apparent in the following specification when considered in light of the attached drawings.

BRIEF DESCRIPTION OF THE DRAWINGS

FIG. 1 is a side elevation of the invention in closed position with leaves trapped therein;

FIG. 2 is a front elevation of one of the baskets;

FIG. 3 is a side elevation of the invention with the baskets shown in separated position shown partially broken away and in section for convenience of illustration;

FIG. 4 is a top plan view of one of the baskets;

FIG. 5 is a side elevational view of one of the baskets, shown partially broken away and in section for convenience of illustration;

FIG. 6 is a bottom plan view of one of the baskets;

FIG. 7 is an enlarged fragmentary vertical sectional view, taken along the line 7—7 of FIG. 2, looking in the direction of the arrows; and FIG. 8 is a fragmentary horizontal sectional view, taken along the line 8—8 of FIG. 7, looking in the direction of the arrows.

DESCRIPTION OF THE PREFERRED EMBODIMENT

Referring now to the drawings in detail, wherein like reference characters indicate like parts throughout the several figures, the reference numeral 10 indicates generally a leaf casket constructed in accordance with the invention.

The leaf casket 10 includes a band 11 forming an open rim to which a wire netting 12 is secured. The netting 12 is formed into a container with the band 11 delineating one open side of the container.

A strip 13 is secured along the open side of the container by rivets 14 which extend through the band 11. The strip 13 has a plurality of teeth 15 formed therealong with the teeth 15 of each of the leaf caskets 10 being adapted to interfit with those of a companion leaf casket 10 as illustrated in FIG. 1.

A handle 16 is integrally formed on the leaf casket 10 at the upper centrally portion of the band 11 as can be seen in FIG. 3. The handle 16 has a lug 17 formed on one side thereof and a companion socket 18 formed adjacent thereto. When the handles 16 are brought into contacting relation the lug 17 on one of the handles 16 fits into the socket 18 of the other handle 16 as can be seen in FIGS. 7 and 8. An opening 19 is formed in the netting 12 adjacent the handles 16 to permit the fingers of the user to extend around the handles 16 as can be seen in FIGS. 1 and 3.

In the use and operation of the invention the caskets 10 are grasped in both hands as shown in FIG. 3 and are brought to the opposite side of a pile of leaves L. The caskets 10 are then moved toward each other until the teeth 15 interfit as well as the lugs 17 engaging in the sockets 18. As can be seen in FIG. 7 the handles are tilted slightly out of the plane of the bands 11 toward the open side of the caskets 10 so that hand pressure around the handle 16 will tend to lock the caskets 10 together. The netting 12 tapers inwardly slightly from the open side to permit the caskets 10 to be nested for storage.

While wire has been disclosed as the netting material, it should be understood that other materials such as plastic may also be used when desired for the netting 12 and other elements of the casket 10.

Having thus described the preferred embodiment of the invention, it should be understood that numerous structural modifications and adaptations may be resorted to without departing from the spirit of the invention.

What is claimed is:

1. In a leaf casket, a pair of similar members each including a band forming an open rim, netting secured to said band, said netting being formed into a container with the band delineating one open side of the container, a strip secured along the open side of the container, said strip having a plurality of teeth formed therealong with the teeth of each of the leaf caskets being adapted to interfit with those of a companion leaf casket, said teeth being blunt to prevent clogging, a handle integrally formed on the leaf casket at the upper central portion of the band, said handle having a lug formed on one side thereof and a companion socket formed adjacent thereto, and whereby when the handles are brought into contacting relation the lug on one of the handles fits into the socket of the other handle, there being an opening formed in the netting adjacent the handles to permit the fingers of the user to extend around the handle, said handles being tilted slightly out the plane of the bands toward the open side of the caskets so that hand pressure around the handle will tend to lock the caskets together, and said netting tapering inwardly slightly from the open side to permit the casket to be nested for storage.

* * * * *